United States Patent [19]

Yew et al.

[11] 3,886,305

[45] May 27, 1975

[54] AUTOMATIC CONTRAST AND DARK LEVEL CONTROL FOR SCANNING ELECTRON MICROSCOPES

[75] Inventors: Nelson C. Yew, Los Altos; David H. Colby, Fremont, both of Calif.

[73] Assignee: Etec Corporation, Hayward, Calif.

[22] Filed: Apr. 24, 1972

[21] Appl. No.: 247,072

[52] U.S. Cl. ........... 178/6.8; 178/DIG. 29; 250/306

[51] Int. Cl. ................................................ H04n 7/18

[58] Field of Search.......... 178/6, 8, 7.3 R, DIG. 29, 178/DIG. 26, DIG. 5, DIG. 1; 250/306, 307, 310, 311

[56] References Cited

UNITED STATES PATENTS

| | | | |
|---|---|---|---|
| 3,229,087 | 1/1966 | Shapiro | 250/306 |
| 3,342,933 | 9/1967 | Zieler | 178/DIG. 5 |
| 3,567,854 | 3/1971 | Tsohantz | 178/DIG. 5 |
| 3,602,641 | 8/1971 | Heise | 178/DIG. 29 |
| 3,612,762 | 10/1971 | Wuellner et al. | 178/DIG. 29 |
| 3,670,100 | 6/1972 | Briggs et al. | 178/DIG. 26 |
| 3,691,302 | 9/1972 | Gaebele et al. | 178/DIG. 29 |
| 3,812,288 | 5/1974 | Walsh et al. | 178/6.8 |

*Primary Examiner*—Howard W. Britton
*Assistant Examiner*—Michael A. Masinick
*Attorney, Agent, or Firm*—Townsend and Townsend

[57] ABSTRACT

A scanning electron microscope in which the contrast and the dark level of the video signal is automatically controlled. Specifically, the peak-to-peak video signal level or contrast is detected and compared with a reference signal. The difference signal therebetween is employed to control the gain imparted to the video signal and to thereby automatically control the video signal contrast. Similarly, the dark level is detected and compared with a reference signal. The difference signal therebetween is employed to bias the video signal and thereby automatically control the dark level of the video signal.

8 Claims, 2 Drawing Figures

AUTOMATIC CONTRAST AND DARK LEVEL CONTROL FOR SCANNING ELECTRON MICROSCOPES

Figures 1, 2:
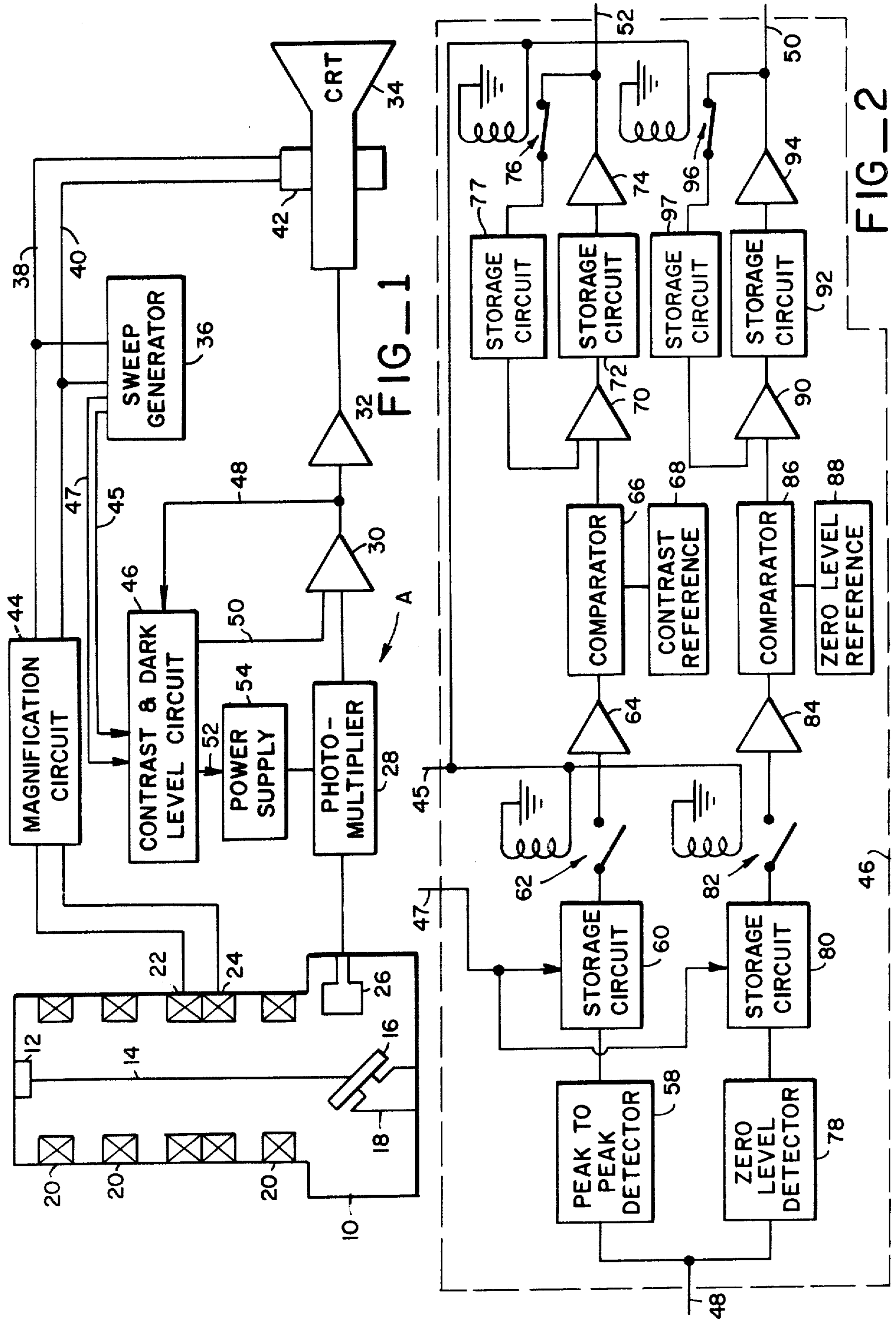

This invention relates to scanning electron microscopes, and more particularly, to an automatic contrast and dark level control system for a scanning electron microscope.

In a scanning electron microscope, an electron beam is focused upon and caused to scan a specimen in a raster-like manner. Electrons emitted by, or reflected from the specimen are collected and amplified to form the video signal. This video signal is employed to intensity modulate the beam of a cathode ray tube, the beam of cathode ray tube being deflected in synchronism with the beam of the scanning electron microscope, to form the desired image of the specimen on the face of the cathode ray tube. In such scanning electron microscope, it is necessary to adjust the gain and bias imparted to the video signal, to insure that the signal displayed will be within the dynamic range of the cathode ray tube. Specifically, the bias or dark level must be adjusted so that the darkest portion of the image will be slightly above the threshold of the cathode ray tube. Similarly, the peak signal gain or contrast must be adjusted so that the brightest portions of the image will be below the saturation level of the cathode ray tube. Heretofore, adjustment of the dark level or bias and contrast or gain has been accomplished manually. Of course, substantial variation in video signals from different samples exist, necessitating frequent tedious and time consuming readjustments of the contrast and dark level.

According to the present invention, a scanning electron microscope is provided with automatic contrast and dark level control circuitry. Specifically, the peak-to-peak video signal level or contrast is detected and compared with a reference signal. The difference signal therebetween is employed to control the gain imparted to the video signal and to thereby automatically control the video signal contrast. According to the preferred embodiment of the present invention, the gain imparted to the video signal is thus controlled by varying the photomultiplier power supply voltage, which, in turn, varies the gain of the photomultiplier tube employed in the video chain.

Similarly, the dark signal level is detected and compared with a reference signal. The difference signal therebetween is employed to bias the video signal and thereby automatically control the dark level of the video signal. Specifically, according to the preferred embodiment of the present invention, a suitable D. C. bias signal is applied to the preamplifier stage following the photomultiplier, to thereby bias or offset the dark level to the desired value.

The detection of the dark level and contrast is accomplished by suitably processing the video signals of an entire video frame. The automatic contrast and dark level control circuitry functions continuously to adjust the gain and D. C. bias imparted to the video signals of a subsequent frame, based upon the contrast and dark level signals detected from the previous frame. In this manner, the contrast and dark level control is continuously updated, so that the cathode ray tube display will be maximized at all times, and will be substantially unaffected by drift or other transient phenomena.

Accordingly, it is an object of the present invention to provide a scanning electron microscope in which the contrast and dark level of the video signal is automatically controlled.

Another object of the present invention is to provide a scanning electron microscope in which the dark level is detected, compared with a reference and employed to control the D. C. bias imparted to the video signal.

Still another object of the present invention is to provide a scanning electron microscope in which the contrast is detected, compared with a reference and employed to control the gain imparted to the video signal.

Yet another object of the present invention is to provide a scanning electron microscope in which the image quality is automatically maximized.

The scanning electron microscope employing automatic contrast and dark level control according to the present invention is advantageous in that need for manual adjustment of the contrast and dark level is substantially eliminated. The continual operation of the automatic contrast and dark level control circuitry insures that the image quality will be maximized at all times. Moreover, the image will be substantially unaffected by drift and other transient phenomena.

These and other objects, features and advantages of the present invention will be more readily apparent from the following detailed description wherein references made to the accompanying drawings, in which:

FIG. 1 is a block diagram of a scanning electron microscope according to the present invention; and FIG. 2 is a more detailed block diagram of the contrast and dark level control circuitry of the apparatus depicted in FIG. 1.

Referring initially to FIG. 1, there is shown a scanning electron microscope, indicated generally at A, having an electronoptical column 10. Disposed within electron-optical column 10 is an electron source 12 adapted to emit a beam of electrons 14 directed toward a specimen 16, supported by a stage 18 within the electron-optical column. A plurality of magnetic focusing coils 20, typically numbering three, are successively disposed along the path of electron beam 14. Focusing coils 20 are suitably energized to produce magnetic lens fields which functions to focus beam 14 upon specimen 16.

A pair of magnetic deflection coils 22 and 24 are disposed along the path of electron beam 14, deflection coils 22 and 24 typically being disposed between the second and third magnetic lens coils 20. As will be described in greater detail hereinafter, deflection coils 22 and 24 are energized to provide a varying magnetic field which causes electron beam 14 to be deflected so as to scan specimen 16 in a raster-like manner. The incidence of electron beam 14 upon specimen 16 causes electrons to be reflected from, or emitted by, specimen 16, which electrons are collected by an electron collector 26.

The foregoing scanning electron microscope electron-optical column structure is old in the art and is described herein for illustrative purposes only, it being understood that the scanning electron microscope automatic contrast and dark level control according to the present invention may be employed with other electron-optical column structures.

Electrons collected by electron collector 26 are applied to a photomultiplier 28 for amplification. The output of photomultiplier 28 is applied to a preamplifier 30 which, in turn, is connected to an amplifier 32.

Preamplifier 30 and amplifier 32 function to provide additional amplification for the video signal.

The thus amplified video signal at the output of amplifier 32 is applied to the control grid of a cathode ray tube 34. Thus, the amplified video signal is employed to intensity modulate the beam of cathode ray tube 34, so that a conventional intensity-modulated image will be formed on the face of the cathode ray tube 34.

As briefly referred to hereinbefore, both the electron beam 14 of the electron-optical column 10 and the beam of cathode ray tube 34 are scanned in synchronism in a raster-like manner. To this end, a sweep generator 36 is provided. Sweep generator 36 functions to generate synchronized repetitive horizontal and vertical ramp waveforms on leads 38 and 40, respectively. These sweep waveform signals are applied to a deflection yoke 42 disposed about the neck of cathode ray tube 34, so as to cause the beam of the cathode ray tube to be deflected in the desired raster-like manner. The sweep signals are also applied to a magnification circuit 44. Magnification circuit 44 functions to attenuate the sweep signals and to apply them to deflection coils 22 and 24. The attenuation provided by magnification circuit 44 causes the beam 14 of the electron-optical column 10 to scan the specimen 16 in a manner similar to, but smaller than, the scanning of the beam of cathode ray tube 34. Thus, the attenuation of magnification circuit 44 functions to determine the magnification of the scanning electron microscope A. The foregoing scanning system is conventional, and is described herein for illustrative purposes only, it being understood that the automatic contrast and dark level control according to the present invention may be employed with other scanning systems.

Sweep generator 36 additionally produces blanking signals, conventionally employed to blank the beam of cathode ray tube 34 during the time interval in which the beam is retraced from the end of one frame to the start of a subsequent frame. Specifically, sweep generator 36 produces a start of blanking signal on a lead 45, and an end of blanking signal on a lead 47. These signals are, of course, produced at the start and finish of the retrace or blanking time interval, respectively. In addition to the conventional use of these signals, the scanning electron microscope according to the present invention employs these signals in the automatic contrast and dark level control, as will be described in greater detail hereinafter.

As briefly referred to hereinbefore, the image quality of the image on cathode ray tube 34 depends upon two electrical properties of the video signal. First, the dark voltage level of the video signal determines the brightness of the darkest regions of the image. Thus, in order to maximize the information displayed on cathode ray tube 34, it is necessary to bias or adjust the dark voltage levels so that it is above the threshold of cathode ray tube 34, in order to avoid loss of information in the displayed image. Similarly, the brightness of the brightest portions of the image, and thus the contrast, is determined by the gain imparted to the peak video signal. Specifically, in order to avoid a loss of information in the displayed image, it is necessary that the peak voltage signal be less than the saturation level of the cathode ray tube 34. To these ends, an automatic contrast and dark level control circuit 46 is provided according to the present invention.

Specifically, the video signal at the output of preamplifier 30 is applied to contrast and dark level circuit 46 via lead 48. As will be described in greater detail hereinafter, contrast and dark level circuit 46 functions to detect the peak signal level and dark level, compare these levels with reference signals, and control the gain and bias of the video chain in response thereto. To this end, contrast and dark level circuit 46 produces a biasing signal on a lead 50, which signal is applied to preamplifier 30 for summing with the video signal. Thus, the contrast and dark level circuit 46 functions to control the dark level by biasing the video signal at the input of preamplifier 30.

Contrast and dark level circuit 46 also produces a gain controlling signal on a lead 52, which signal is applied to the power supply 54 of photomultiplier 28. Specifically, the signal on lead 52 is employed to vary the output voltage of power supply 54, and to thus vary the voltage applied to photomultiplier 28. Since the gain of photomultiplier 28 depends, in part, upon the power supply voltage applied thereto, it is apparent that the gain of photomultiplier 28 will be varied in response to the signal on lead 52. Thus, contrast and dark level circuit 46 functions to adjust the gain of photomultiplier 28, and thus the gain of the video chain.

Referring now to FIG. 2, the construction and operation of automatic contrast and dark level control circuit 46 will now be described in detail. Referring first to the contrast control function, the video signal on lead 48 is applied to a peak-to-peak detector 58, which, as its name implies, functions to continuously detect the peak-to-peak video signal level or contrast.

The output of peak-to-peak detector 58 is connected to a storage circuit 60, which functions to store the maximum peak-to-peak video signal level detected by peak-to-peak detector 58. Typically, storage circuit 60 may comprise a capacitor. Of course, the time constant associated with storage circuit must be substantially greater than the time duration of one video frame. Storage circuit 60 includes circuitry to reset or discharge the storage circuit at the end of each video frame, so that the storage circuit 60 will be available to receive and store the peak-to-peak video signal level detected for the subsequent video frame. Specifically, the end of blanking signal produced by sweep generator 36 on lead 47 is applied to the reset input of storage circuit 60, to discharge or reset the storage circuit at the end of each blanking interval.

The output of storage circuit 60 is connected to the normally open contacts of a relay 62. The coil of relay 62 is energized by the start of blanking signal on lead 45 at the start of the blanking interval following the end of each video frame. Accordingly, the maximum peak-to-peak video signal level for a particular frame, stored in storage circuit 60, will be applied via the contacts of relay 62 to the input of a buffer amplifier 64, at the start of the blanking interval between video frames. Buffer amplifier 64 possesses a sufficiently high input impedance to prevent the substantial discharging of storage circuit 60 therethrough. Thus, the maximum peak-to-peak video signal level for each video frame will appear at the output of buffer amplifier 64, at the start of each blanking interval.

The output of buffer amplifier 64 is connected to the input of comparator 66. A constast reference voltage supply 68 is provided to produce a voltage signal corresponding to the desired maximum peak-to-peak video signal. The contrast reference voltage is applied to comparator 66 for comparison with the detected peak-to-peak video signal level, during the time interval between video frames or blanking interval. Thus, comparator 66 produces a difference signal representative of the difference between the desired or reference peak-to-peak signal level and the actual or detected peak-to-peak signal level. As briefly referred to hereinbefore, this difference signal is employed to control the gain of the video chain.

To this end, circuitry is provided to store the difference signal for use during the subsequent video frame. Specifically, the output of comparator 66 is connected to the input of a differential amplifier 70. The output of differential amplifier 70 is connected, in turn, to a storage circuit 72. Storage circuit 72 may be substantially identical to storage circuit 60 and may thus comprise a capacitor and associated circuitry having a time constant substantially greater than the duration of one video frame.

Storage circuit 72 is connected to the input of a buffer amplifier 74, which possesses a sufficiently high input impedance to prevent discharging of storage circuit 72 therethrough. The output of buffer amplifier 74 is connected to lead 52 for application to the photomultiplier power supply 54 as described hereinbefore. In addition, the output of buffer amplifier 74 is connected to the normally closed contacts of a relay 76. As described with respect to relay 62, the coil of relay 76 is connected to lead 45, so that the relay will be energized at the start of each blanking interval. The normally closed contacts of relay 76 are connected to the input of a storage circuit 77. Storage circuit 77 is substantially identical to storage unit 72, and functions to store the output signal of buffer amplifier 74. The output of storage circuit 77 is applied to one of the inputs of differential amplifier 70. During the blanking interval, when the contacts of relay 76 are open, storage circuit 77 functions to apply the present stored difference signal to the input of differential amplifier 70, for differencing with the desired or subsequent difference signal. Thus, during the blanking interval; the output of amplifier 70 will correspond to the difference between the present and subsequent difference signals, which will be added to the present difference signals stored in storage circuit 72 to update it to the subsequent video signal level. Accordingly, the difference signal stored in storage circuit 72 is periodically updated at the end of each video frame.

Dark level control is accomplished by contrast and dark level control circuit 46 in a substantially identical manner. Specifically, the video signal on lead 48 is applied to a zero level detector 78. Zero level detector 78 functions to produce a voltage signal corresponding to the dark level or zero level of the video signal. To this end, zero level detector 78 may comprise an inverter and peak detector. The detected zero level signal is applied to storage circuit 80, which is substantially identical to storage circuit 60 previously described. Storage circuit 80 thus includes resetting circuitry connected to lead 47 to reset storage circuit 80 at the end of each blanking interval.

The output of storage circuit 80 is applied via a relay 82 to the input of a buffer amplifier 84. Relay 82 and buffer amplifier 84 are respectively identical to relay 62 and buffer amplifier 64, previously described. Similarly, the output of buffer amplifier 84 is connected to one input of a comparator 86, substantially identical to comparator 66.

A zero level reference voltage supply 88 is provided to produce a voltage signal corresponding to the desired dark or zero level. The zero level reference voltage is applied to comparator 86 for comparison with the detected zero level. Thus, comparator 86 produces a difference signal representative of the difference between the desired or reference zero level and the actual or detected zero level. As briefly referred to hereinbefore, this difference signal is employed to control the bias of the video signal.

To this end, circuitry is provided to store the difference signal, substantially as described with respect to the contrast control function. Specifically, the output of comparator 86 is connected to the input of a differential amplifier 90. The output of differential amplifier 90 is applied to a storage circuit 92. Differential amplifier 90 and storage circuit 92 are substantially identical to differential amplifier 70 and storage circuit 72 previously described. Storage circuit 92 is connected to the input of a buffer amplifier 94, corresponding to buffer amplifier 74 previously described. The output of buffer amplifier 94 is applied to lead 50 to bias the video chain via preamplifier 30, as described hereinbefore.

In addition, the output of buffer amplifier 94 is applied to a storage circuit 97 via the normally closed contacts of a relay 96. Relay 96 and storage circuit 97 are thus identical to relay 76 and storage circuit 77 previously described. Accordingly, storage circuit 97 functions to apply the present difference signal to the input of differential amplifier 90 for differencing with the subsequent desired difference signal, during the blanking interval. Differential amplifier 90 thus differences the present and subsequent difference signal to produce an updating signal for application to storage circuit 92. Thus, the difference signal stored in storage circuit 92 is periodically updated, during the blanking time interval between video frames.

In operation, a specimen 16 is mounted to stage 18, and the interior of electron-optical column 10 evacuated. Electron gun 12 and focusing coils 20 are suitably energized to focus an electron beam 14 upon specimen 16. The sweep signals produced by sweep generator 36 are simultaneously applied to deflection coils 22 and 24, via magnification circuit 44. Thus, electron beam 14 will scan specimen 16 in a raster-like manner, which will be accompanied by the similar scanning of the beam of cathode ray tube 34. Electrons will be reflected from, or emitted by, specimen 16, which electrons are collected by electron collector 26. These electrons are amplified by photomultiplier 28, preamplifier 30 and amplifier 32, and employed to modulate the intensity of the beam of cathode ray tube 34.

During each video frame, the video signal at the output of preamplifier 30 is monitored by contrast and dark level control circuit 46. Contrast and dark level control circuit 46 produces two signals in response thereto. First, a contrast control signal is produced on lead 52 and applied to photomultiplier power supply 54 to control the voltage supplied thereby, and thus to vary the gain of the photomultiplier 28. Second, a D.C. bias signal is produced on lead 50, and is applied to preamplifier 30 to bias the video signal.

With specific regard to the contrast control function of contrast and dark level control circuit 46, peak-to-peak detector 58 continuously produces a signal representative of the peak-to-peak level of the video signal. The maximum peak-to-peak signal level is stored in storage circuit 60 during the video frame. At the start of the blanking interval following the end of the video frame, this maximum signal is applied to comparator 66 where it is compared with the contrast reference signal produced by contrast reference supply 68. The difference signal therebetween is employed to update the contrast control signal stored in storage circuit 72, for the subsequent frame. Accordingly, at the start of each blanking interval, the contrast control signal stored in storage circuit 72 is updated to continually optimize the contrast of the image on cathode ray tube 34. At the end of each blanking interval, storage circuit 60 is reset by the signal on lead 47, so that the circuitry is made ready for receipt of the video signal from the subsequent video frame.

The dark level control function of contrast and dark level control circuit 46 is accomplished in a similar manner. Specifically, during each video frame, zero level detector 78 functions to produce a signal corresponding to the dark or zero level, which is stored in storage circuit 80. At the start of the blanking interval following the end of each video frame, this signal is applied to comparator 86 for comparison with the zero level reference signal produced by zero level reference supply 88. The difference therebetween is employed to update the bias control signal stored in storage circuit 92, for the subsequent frame. Accordingly, at the end of each frame, the bias control signal stored in storage circuit 92 is updated to optimize the dark level of the video signal. At the end of each blanking interval, storage circuit 80 is reset by the signal on lead 47, so that the circuitry is made ready to receive the video signals from the subsequent video frame.

Accordingly, the scanning electron microscope employing contrast and dark level control according to the present invention will automatically produce a video image having optimal contrast and dark level. Thus, the need for continual manual adjustment of the contrast and dark level is substantially eliminated. Moreover, contrast and dark level control circuitry according to the present invention automatically regulates any variation in contrast and dark level produced by drift or other transient phenomena. Thus, the image quality of the scanning electron microscope according to the present invention is effectively maximized.

While a particular embodiment of the present invention has been shown and described in detail, it is apparent that adaptations and modifications will occur to those skilled in the art. Such adaptations and modifications are specifically within the spirit and scope of the present invention, as set forth in the claims.

What is claimed is:

1. In a scanning electron microscope having means for emitting an electron beam, means for focusing said electron beam on a specimen, a cathode ray tube having an electron beam internal thereto, scanning means for scanning said electron beams in a raster-like manner, an electron collector disposed adjacent said specimen and video chain means for amplifying the signal of said electron collector to form a video signal intensity modulating the beam of said cathode ray tube, the improvement comprising: detector means for detecting the zero level of the video signal of a video frame, storage means for storing during the subsequent video frame a signal related to the output of said detector means from the previous video frame, and control means for controlling the bias of said video chain means in response to the signal in said storage means to control the zero level of the video signal of the subsequent video frame in response to the detected zero level of the video signal of the previous video frame.

2. Apparatus according to claim 1 comprising: comparator means for comparing the detected zero level of said detector means with a reference level, the output of said comparator means being applied to said storage means.

3. Apparatus according to claim 2 comprising: switching means responsive to said scanning means for applying said detected zero level from said detector means to said comparator means at the end of each video frame.

4. Apparatus according to claim 3 wherein said reference level is above the threshhold level of said cathode ray tube.

5. In a scanning electron microscope having means for emitting an electron beam, means for focusing said electron beam on a specimen, a cathode ray tube having an electron beam internal thereto, scanning means for scanning said electron beams in a raster-like manner, an electron collector disposed adjacent said specimen and video chain means including a photomultiplier for amplifying the signal of said electron collector to form a video signal intensity modulating the beam of said cathode ray tube, the improvement comprising: detector means for detecting the peak-to-peak level of the video signal of the video frame, storage means for storing during the subsequent video frame a signal related to the output of said detector means from the previous video frame, and control means for controlling the supply voltage applied to said photomultiplier to control the gain of said video chain means in response to the signal in said storage means, the contrast of the video signal of the subsequent video frame being responsive to the detected peak-to-peak level of the video signal of the previous video frame.

6. Apparatus according to claim 5 wherein said reference level is below the saturation level of said cathode ray tube.

7. Apparatus according to claim 5 comprising: comparator means for comparing the detected peak-to-peak level of said detector means with a reference level, the output of said comparator means being applied to said storage means.

8. Apparatus according to claim 7 comprising: switching means responsive to said scanning means for applying said detected peak-to-peak level from said detector means to said comparator means at the end of each video frame.

* * * * *